United States Patent [19]

Jones et al.

[11] 3,826,170

[45] July 30, 1974

[54] APPARATUS FOR CUTTING SHEET MATERIAL

[75] Inventors: Charles V. Jones; James W. Alvey; Charles H. Sawborn, III, all of Brookhaven, Mich.

[73] Assignee: Kellwood Company, St. Louis, Mo.

[22] Filed: July 18, 1972

[21] Appl. No.: 272,768

[52] U.S. Cl............ 83/657, 76/107 C, 83/55, 83/532, 83/652, 83/696, 83/698, 83/925 CC
[51] Int. Cl............ B26f 1/46, B26d 7/26
[58] Field of Search............ 83/657, 696, 698, 699, 83/652, 654, 532, 532, 1, 29, 55, 533, 925 CC; 76/107 C

[56] References Cited
UNITED STATES PATENTS

| 781,297 | 1/1905 | Parsons | 83/699 X |
|---|---|---|---|
| 1,085,037 | 1/1914 | Hall | 83/698 X |
| 2,692,020 | 10/1954 | Oberhardt | 83/533 X |
| 3,335,628 | 8/1967 | Simms et al. | 83/652 |
| 3,527,132 | 9/1970 | Creffield | 83/698 |

FOREIGN PATENTS OR APPLICATIONS

| 1,184,342 | 3/1970 | Great Britain | 83/696 |
|---|---|---|---|
| 245,350 | 8/1910 | Germany | 83/657 |
| 67,475 | 7/1876 | Germany | 83/657 |

Primary Examiner—Roy Lake
Assistant Examiner—James F. Coan
Attorney, Agent, or Firm—Koenig, Senniger, Powers and Leavitt

[57] ABSTRACT

A cutting blade system for cutting sheet material into pieces of generally the same contour but of different sizes, especially useful in the manufacture of apparel for cutting cloth into pieces to be sewn together into garments. The system involves a set of primary cutting blade segments common to all sizes of a piece of given contour or pattern to be cut out of the sheet material and a set of auxiliary cutting blade segments additive to (or subtractive from) the primary segments to constitute cutting blade assemblies of different sizes in the stated contour or pattern. The segments are made of steel rule die stock, are releasably held together in assembly, and assemblies of segments in various patterns are utilized in a hydraulic press for die-cutting through one or more layers of material in the press. The press may have an electromagnetic head for magnetically gripping the assemblies for the cutting operation, and for quickly releasing them after the cutting operation, whereupon the assemblies may be disassembled and the primary segments reassembled with auxiliary segments in a different size.

4 Claims, 19 Drawing Figures

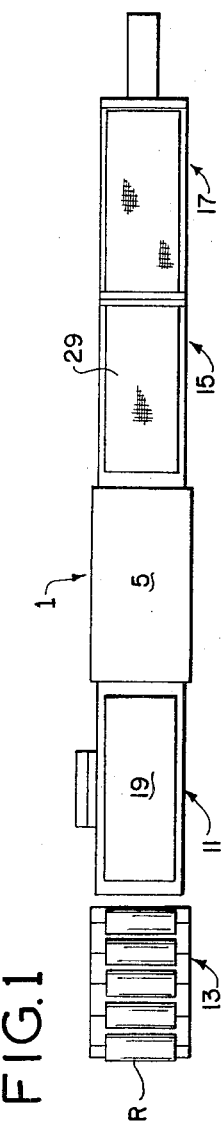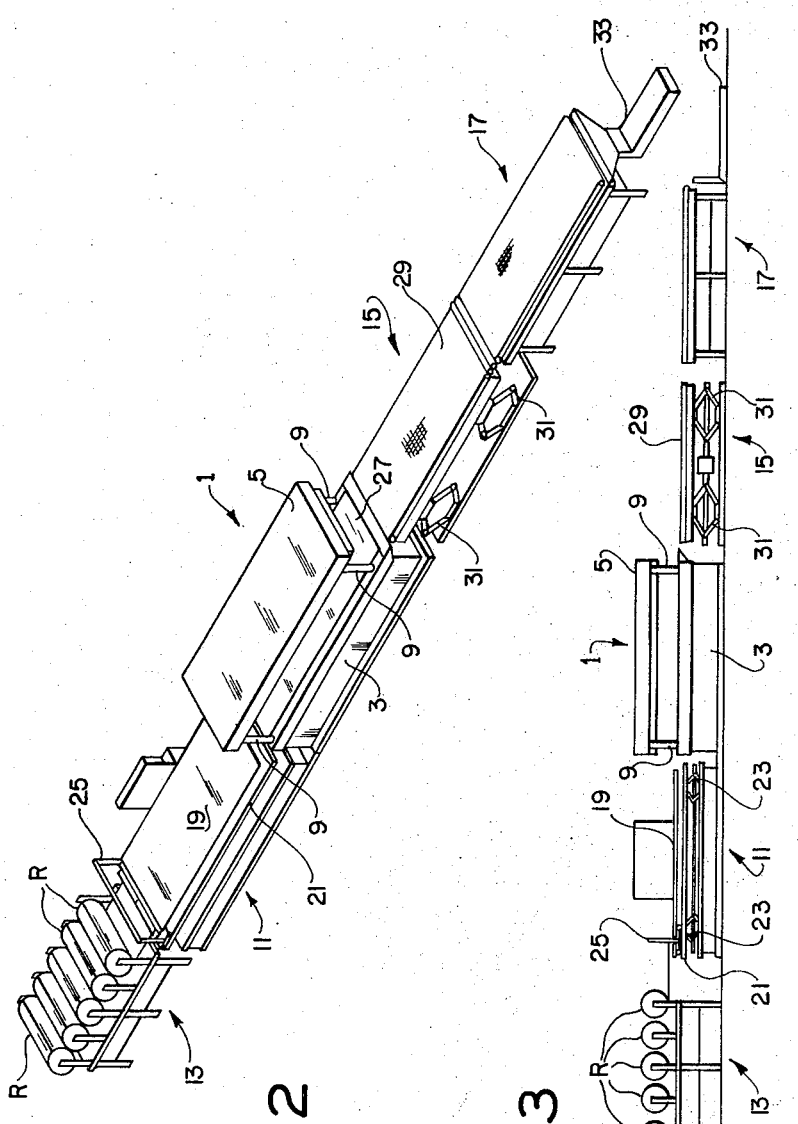
FIG.1
FIG.2
FIG.3

APPARATUS FOR CUTTING SHEET MATERIAL

BACKGROUND OF THE INVENTION

This invention relates to methods of and apparatus for cutting sheet material, and more particularly to methods of and apparatus for cutting sheet material such as textile fabrics into pieces for the manufacture of apparel.

In the manufacture of apparel, the conventional long-established method of cutting fabric into pieces to be sewn together to form a garment has been to lay up a plurality of layers of the fabric on a so-called lay-up table, for example, apply on top of the layers a pattern sheet (a sheet of paper) having the patterns of a plurality of pieces marked thereon in pencil (and arranged for minimizing waste of the fabric), and then manually to cut the layers (and the pattern sheet) following the outlines marked on the pattern sheet, utilizing a reciprocating knife. This is a relatively costly procedure, requiring highly skilled operators, and even such operators working with reasonable care cannot always cut the pieces without rejects or cut all pieces with any such degree of precision as may be requisite to effective automated sewing of the pieces in the manufacture of the garments.

More recently, equipment has been offered for sale as useful for die cutting sheet material into pieces for various purposes, including die cutting fabric into pieces for the manufacture of apparel, the equipment including a hydraulic press for driving cutters of the so-called clicker die type through the material. However, the utilization of such equipment (which itself is quite costly) in the manufacture of apparel has not been economically attractive because of the necessity for the provision of a multiplicity of clicker dies, one for each and every piece of a particular garment in each and every size of the piece, to cut each piece in the various sizes needed for the manufacture of a garment in different sizes, for example, the manufacture of a jacket in small, medium, large and extra large sizes. Thus, as to this example, assuming that a particular style of jacket is composed of 15 pieces, 60 different clicker dies would be needed simply to cut the pieces for the four sizes in this style. And, observing that a manufacturer will generally produce a plurality of styles, the number of clicker dies needed can easily become excessive. Even the storage of the number of clicker dies required is a serious problem. Adjustable cutting dies have been proposed, but, so far as known, they have not come into use to any substantial extent in the manufacture of apparel, probably because they are relatively complicated in construction and relatively expensive to make and use.

SUMMARY OF THE INVENTION

Accordingly, among the several objects of this invention may be noted the provision of a new system of cutting sheet material, particularly for cutting material into pieces for the manufacture of apparel, and for cutting each piece in different sizes, with sufficient economy in regard to the cost of the cutting instrumentalities and the cost of utilizing them and the reduction of rejects as to enable economical utilization of the equipment as above mentioned, replacing the conventional manual piece-by-piece cutting; the provision of such a system adapted for accurate, clean cutting of the material into pieces of various contours, and various sizes in each contour (e.g., small, medium, large, extra large), thereby reducing waste of material and rendering more practical the automation of sewing operations on the pieces; and the provision of such a system including the cutting of openings, e.g., slits in the pieces, as well as the cutting of the pieces themselves.

Fundamental to the invention is the provision of a special cutting blade system for cutting pieces of generally the same contour but of different sizes, comprising a set of primary cutting blade segments common to all sizes of a given piece to be cut out of the sheet material and a set of auxiliary cutting blade segments additive to (or subtractive from) the primary segments to constitute cutting blade assemblies of different sizes in the stated contour. Each segment comprises a length of blade stock (e.g., a length of steel rule die stock) which is relatively thin in relation to its width, each segment having one edge thereof sharpened to a cutting edge. The segments are structured for temporary assembly in the contour of a piece to be cut and in the different sizes of said piece with the cutting edges of the segments extending continuously in the contour of said piece, and for ready disassembly from said temporary assembly. Cutting blade assemblies made up of such blade segments are utilized in a hydraulic press for die-cutting sheet material into pieces as required.

Other objects and features will be in part apparent and in part pointed out hereinafter.

BRIEF DESCRIPTION OF THE DRAWINGS

FIG. 1 is a plan of apparatus including a fabric lay-up table and a press such as may be used in carrying out the invention;

FIG. 2 is a perspective of the FIG. 1 apparatus;

FIG. 3 is a side elevation of the FIG. 1 apparatus;

Corresponding reference characters indicate corresponding parts throughout the several views of the drawings.

DESCRIPTION OF THE PREFERRED EMBODIMENTS

Figure 4:
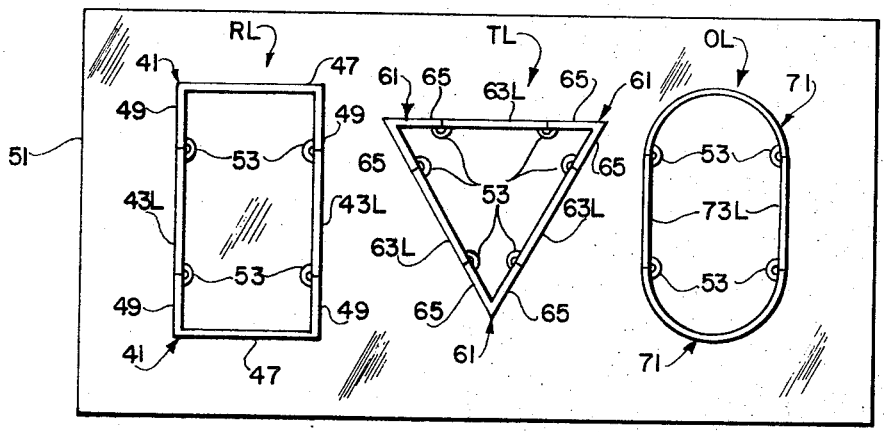
FIG. 4 is a plan of three different cutting blade assemblies for cutting pieces each of a first size, e.g., a large size, assembled on an assembly or set-up board.

Referring first to FIGS. 1–3 of the drawings, there is indicated at 1 a hydraulic press such as may be used in carrying out cutting operations in accordance with this invention. As shown, this press is of a type having an elongate rectangular bed 3 and an elongate rectangular top beam or head 5 hydraulically movable downwardly toward the bed from a raised retracted position and back up to retracted position via hydraulic cylinder and piston units, such as indicated at 7 in FIG. 8, one at each of the four corners of the bed. The head 5 is secured to the upper ends of the piston rods 9 of these units 7.

At one end of the press (its left end as viewed in FIGS. 1–3) is a lay-up table 11, and at the left end of this table is a rack 13 for holding a plurality of rolls R of the material, e.g., cloth, to be cut. At the other end of the press (its right end as viewed in FIGS. 1–3) is a so-called stacker 15 for stacking up material received from the press, and at the right end of the stacker is a so-called take-off conveyor 17. The lay-up table has a top shuttle plate 19 on which layers of material pulled from a roll R and cut to length are laid up in a stack one on top of another. The shuttle plate 19 is movable endwise on a platform 21 from a rearward lay-up position (in which it appears in FIGS. 1–3) to an advanced position extending into the press between its head and bed for delivering the stack to the press for a cutting operation. The lay-up table, as shown, is of the elevator table type, having means such as indicated generally at 23 in FIG. 3 for raising and lowering the platform 21 for height adjustment of the shuttle plate 19. At 25 is indicated means for pulling material forward from a roll R over the shuttle plate 19, this means being operable to pull out any desired length of the material for each layer. When a length has been pulled out, it is cut off by suitable cutting means (not shown), and this lay-up operation is repeated until the desired number of lengths have been pulled out, cut off and stacked one on top of another on the shuttle plate 19 (in its rearward retracted position). Generally, it is contemplated that up to eighteen layers may be laid up on the shuttle plate.

When the lay-up has been completed, the lay-up shuttle plate 19 is moved forward to its advanced position in the press. It moves into the press between the two rear piston rods 9, the press head 5 being raised, overlying a second shuttle plate 27, which is associated with the stacker 15, extending rearward from the stacker on top of the bed 3 of the press. When the shuttle plate 19 carrying the stack of layers to be cut has been moved into the press, the layers are pressed down as by means of suitable pressing fingers (not shown) to hold the layers in the press while the shuttle plate 19 is shuttled back on to the lay-up table for another lay-up operation. The layers are thus disposed on the stacker shuttle plate 27 for the cutting operation involving die cutting of the layers to form pieces (to be subsequently described in detail). The shuttle plate 27 is then moved forward out of the press to bring it and the cut layers on top of the stacker 15. The latter comprises an endless conveyor 29 on elevator means such as indicated at 31 for raising and lowering it. The cut layers are deposited on the upper horizontal reach of this conveyor 29 by holding the layers and shuttling the shuttle plate out from under the layers back into the press. Then the conveyor 29 is lowered to receive the next set of cut layers from the press.

When a desired number of sets of layers has been stacked up on the conveyor 29 of the stacker (e.g., two sets of eighteen layers each), the conveyor 29 is set in operation to feed the stack forward on to the take-off conveyor 17, which is also an endless belt conveyor (but not necessarily on an elevator). An operator (or operators) working at the take-off conveyor takes off the cut pieces; and the take-off conveyor is actuated to convey away the waste material (minimized as much as possible) and deliver it to a waste disposal system generally indicated at 33.

Figure 8:
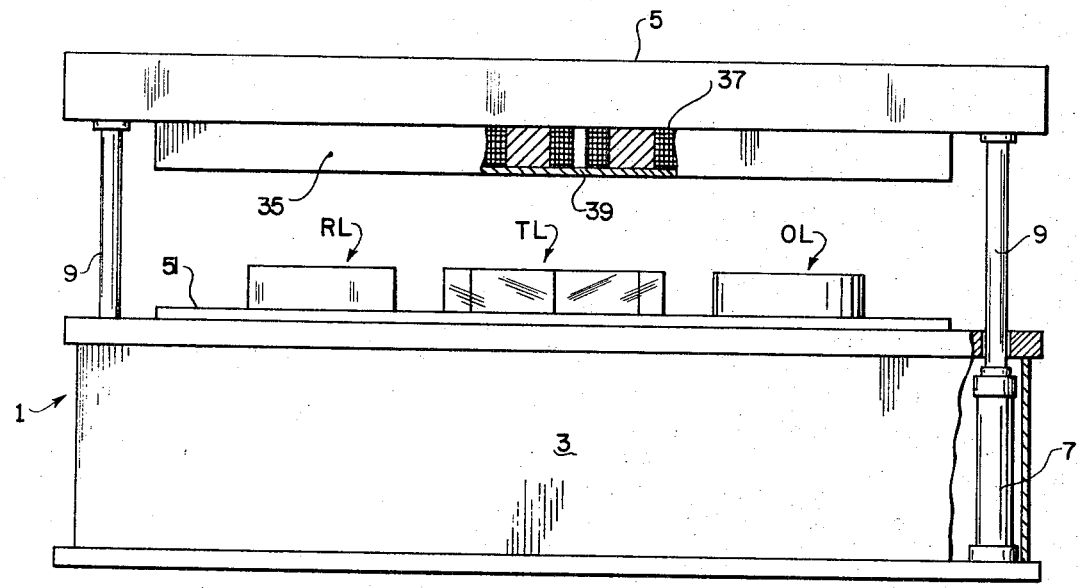
FIG. 8 is a view in elevation, with parts broken away and shown in section, showing the board with the three cutting assemblies of FIG. 4 on the bed of the press of FIGS. 1-3, the head of the press being raised.
Figure 9:
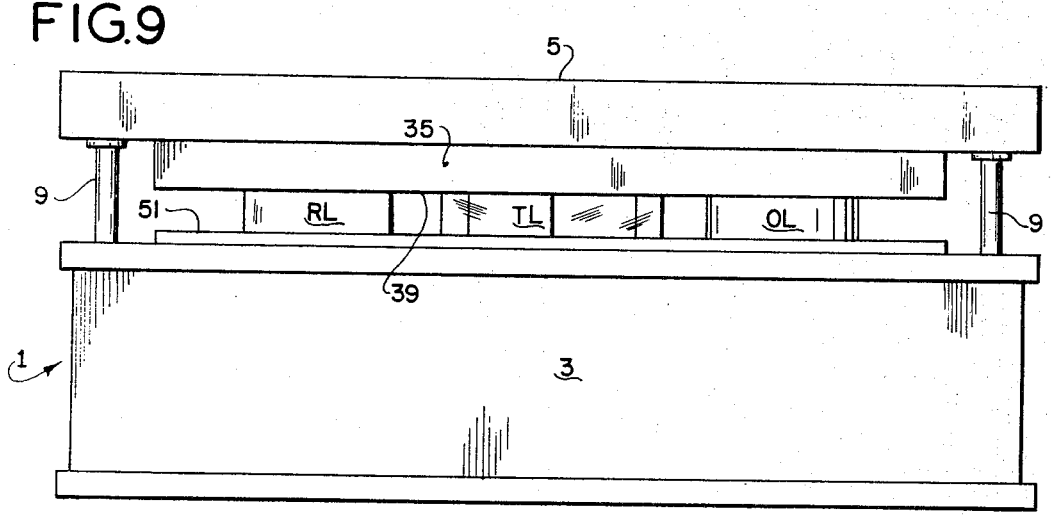
FIG. 9 is a view corresponding to FIG. 8 showing the head of the press lowered for magnetic pick-up of the cutting blade assemblies by the head (which as illustrated in FIG. 8 is an electromagnetic head)
Figure 10:
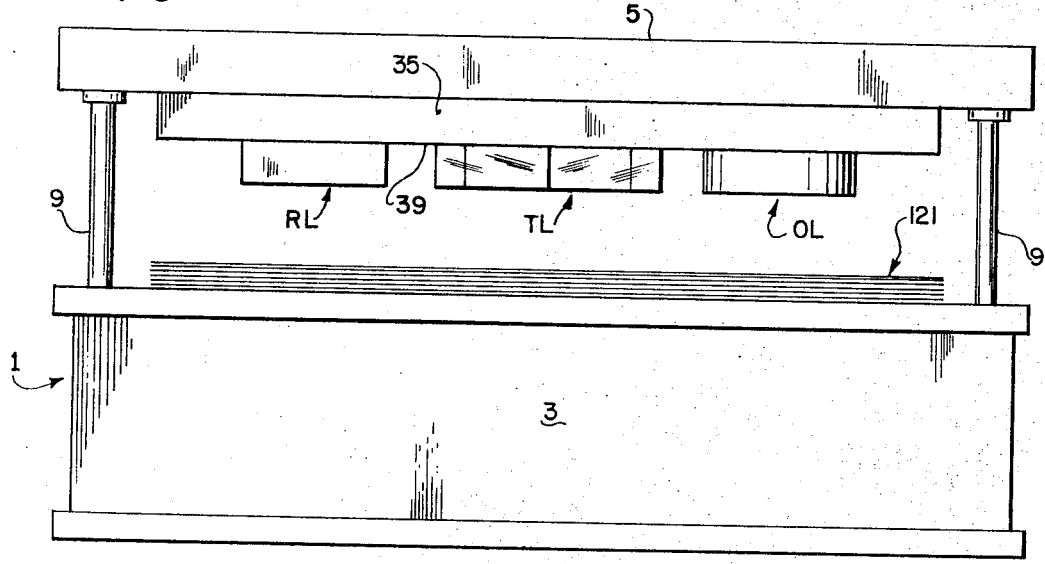
FIG. 10 is a view similar to FIG. 9 showing the head raised, and having carried up with it the cutting blade assemblies, and a plurality of layers of material on the bed of the press to be cut.

In accordance with this invention, the press head 5 is constituted as an electromagnetic head by providing it with a lifting magnet means on the bottom as indicated generally at 35 in FIGS. 8–10. The windings of this magnet means are indicated at 37 in FIG. 8, and it has a flat magnetic bottom plate 39. Suitable electric circuitry is provided for energizing the electromagnetic head for picking up and holding cutting blade assemblies to be described, and for reversely energizing the head to facilitate release of the assemblies.

Figure 5:
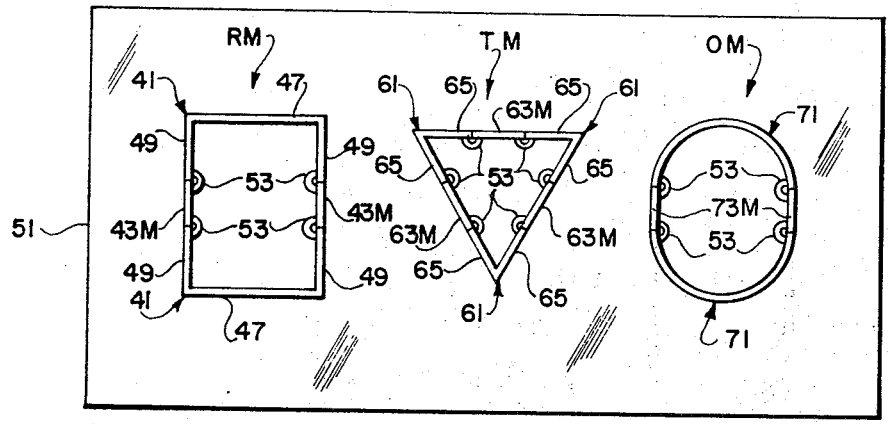
FIG. 5 is a view similar to FIG. 4 showing certain components of each of the three assemblies reconstituted in a second and smaller size, e.g., a medium size.
Figure 6:
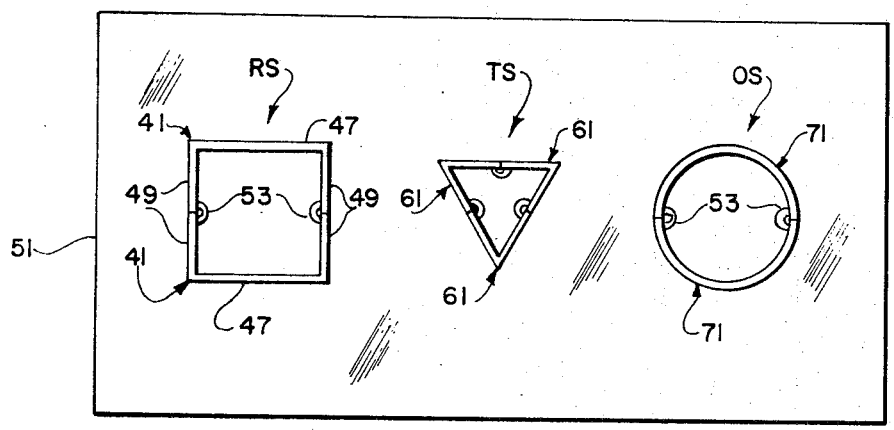
FIG. 6 is a view similar to FIGS. 4 and 5 showing certain components of each of the three assemblies reconstituted in a third and still smaller size, e.g., a small size.

FIGS. 4–6 illustrate in diagrammatic manner, and with reference to simple geometric forms, the fundamentals of the cutting blade system of this invention for cutting pieces of generally the same outline or contour, but of different sizes. The geometric forms selected solely for purposes of illustration are a rectangle, a triangle, and a figure with semi-circular segments. Thus, FIG. 4 shows a first cutting blade assembly RL of rectangular outline or contour, a second cutting blade assembly TL of triangular outline or contour, and a third cutting blade assembly OL generally of O-shape. It will be understood that these geometric forms may not generally occur in apparel manufacture; however, they are useful to illustrate the principle of the invention, and more complex geometrical figures such as may occur in apparel will be mentioned later.

Figure 10A:
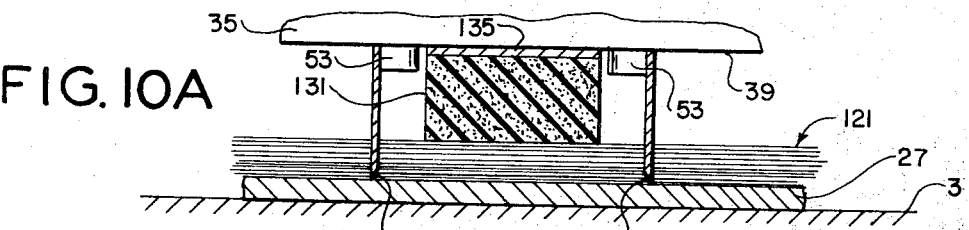
FIG. 10A is an enlarged fragment of FIG. 10, with parts broken away and shown in section, and showing the head and a cutting blade assembly down.

Assembly RL in FIG. 4 is shown as comprising a set of two identical primary cutting blade segments each designated 41, and a set of two identical auxiliary cutting blade segments each designated 43L. Each of these segments comprises a length of cutting blade stock, and more particularly steel rule die stock such as is widely used in the manufacture of so-called clicker dies, which is relatively thin in relation to its width. Each segment has one of its longitudinal edges sharpened to a cutting edge, as indicated at 45 in FIGS. 7 and 10A. Each of the primary cutting blade segments 41, as illustrated, is of three-sided form, having a relatively long side 47 and two shorter sides 49 integral with and extending in the same direction from the ends of the long side at right angles thereto. These sides are sharpened at one edge (the lower edge as viewed in FIGS. 4 and 7) on the inside (as distinguished from the outside); i.e., the bevel of the sharpened edge is on the inside and each of the three sides is entirely flat on the outside. Each of the auxiliary cutting blade segments 43L, as illustrated, is a straight length of the steel rule die stock, sharpened on one side only (which is its inside) to provide the cutting edge and entirely flat on its other side (its outside).

In assembly RL, the four blade segments are temporarily assembled in a rectangular pattern with the primary segments 41 at the ends and the auxiliary segments 43L at the sides of the rectangle. The primary segments 41 are placed in upright position on an assembly board 51 with their long sides 47 parallel to one another and spaced a distance corresponding to the length of the rectangle to be formed and with their short sides 49 coplanar and extending toward one another, the ends of the short sides being spaced a distance equal to the length of the auxiliary segments 43L. The latter are interposed between the ends of the short sides 49 of segments 41, with their flat sides on the outside, the segments being assembled in the rectangular pattern with one end of each segment in end-to-end abutting relation with an end of another segment and with the cutting edges 45 of the segments extending continuously, without any deviation, in the rectangular pattern. Thus, the cutting edges of the left-hand sides 49 of primary segments 41 are aligned with the cutting edge of the left-hand auxiliary segment 43L, and the cutting edges 45 of the right-hand sides of primary segments 41 are aligned with the cutting edge 45 of the right-hand auxiliary segment 43L. Means is provided for releasably holding the segments assembled in the pattern RL, this means being shown in FIGS. 4, 7 and 10A as comprising small permanent magnets 53 for magnetically gripping the segments extending across their abutting ends on the inside (they could be on the outside).

Assembly TL in FIG. 4 is shown as comprising a set of three identical primary cutting blade segments each designated 61, and a set of three identical auxiliary cutting blade segments each designated 63L. These are made of the same stock as the segments of assembly RL and have cutting edges 45 the same as the segments of R. Each of the primary segments 61 is of V-shape (with a 60° angle as illustrated), its two sides each being designated 65, and each of the auxiliary segments is a straight length of the steel rule die stock. In assembly TL, the six blade segments are temporarily assembled in a triangular pattern on the assembly board 51 with the V-shaped segments 61 at the three corners of the triangle and the auxiliary straight segments 63L interposed between the ends of the sides 65 of the V-shaped segments with their flat sides on the outside, the segments being assembled in the triangular pattern with one end of each segment in end-to-end abutting relation with an end of another segment, and with the cutting edges of the segments extending continuously, without any deviation, in the triangular pattern. Magnets 53 releasably hold the segments asssembled.

Assembly OL in FIG. 4 is shown as comprising a set of two identical semicircular primary cutting blade segments each designated 71, and a set of two identical straight auxiliary cutting blade segments each designated 73L. These are made of the same stock as the segments of assemblies RL and TL and have cutting edges 45 the same as the segments of RL and TL. The segments are temporarily assembled on the board 51 in the O-shaped pattern shown in FIG. 4 with the primary segments 71 at the ends and the auxiliary segments 73L at the sides interposed between the ends of the primary segments with their flat sides on the outside, the segments being assembled and held together by magnets 53 with one end of each segment in end-to-end abutting relation with an end of another segment and with the cutting edges 45 of the segments extending continuously, without deviation, in the O-shaped pattern.

The assemblies RL, TL and OL of FIG. 4 are assemblies for cutting pieces of large size of the rectangular, triangular and O-shaped contours. FIG. 5 illustrates three similar assemblies RM, TM and OM for cutting pieces of corresponding contour but of medium size. Assembly RM comprises the same primary cutting blade segments 41 as assembly RL, but has shorter auxiliary segments 43M substituted for the auxiliary segments 43L. Assembly TM comprises the same primary cutting blade segments 61 as the assembly TL, but has shorter auxiliary segments 63M substituted for the auxiliary segments 63L. Assembly OM comprises the same primary cutting blade segments 71 as the assembly OL, but has shorter auxiliary segments 73M substituted for the auxiliary segments. FIG. 6 illustrates three similar assemblies RS, TS and OS for cutting pieces of corresponding contour but of medium size. Assembly RS comprises the same primary cutting blade segments 41 as assemblies RL and RM, but does not have any auxiliary segments. Assembly TS comprises the same primary cutting blade segments 61 as the assemblies TL and TM, but does not have any auxiliary segments. And assembly OS comprises the same primary cutting blade segments 71 as the assemblies OL and OM, but does not have any auxiliary segments.

In each of the medium size assemblies shown in FIG. 5 and in each of the small size assemblies shown in FIG. 6, as in the large size assemblies shown in FIG. 4, the cutting edges 45 of the segments extend continuously, without deviation, in the respective pattern of the assembly. Thus, each is adapted to make a continuous cut, without any gaps or offsets. It will be observed that no segments meet at a corner. This is desirable to avoid any necessity for accurate mitering of ends of lengths of the steel rule die stock meeting at a corner as may be required for complete severance of the material (and especially textile fabrics) at a corner. Thus, it is desirable that, if there are any corners in a pattern, segments be made continuous around each corner. Single long auxiliary segments are shown in FIG. 4 for the large sizes of assemblies. It will be understood, however, that a plurality of auxiliary segments may be used in place of a single auxiliary segment; for example, it is possible that two of the auxiliary segments such as shown for the medium sizes in FIG. 5 may be used in place of a single long segment in FIG. 4 (where the size differential may be so handled). In the small size assemblies of FIG. 6, which are made up without auxiliary segments, the ends of the primary segments abut one another directly.

Figure 7:
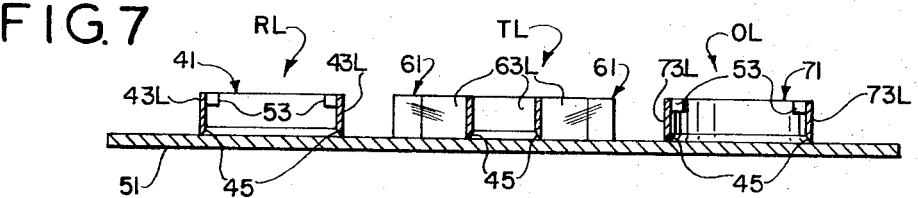
FIG. 7 is a vertical section through the three assemblies (and assembly board) of FIG. 4.

As shown in FIG. 7 for the large size assemblies, the segments are assembled on the board 51 with their cutting edges down, and the other assemblies are laid out in the same manner on a board. The magnets 53 hold the segments in assembly and keep the auxiliary segments from tipping over. The primary segments are capable of standing erect on the assembly board by themselves.

In accordance with this invention, and referring to FIG. 8, an assembly board 51 with a plurality of cutting blade assemblies thereon, e.g., the large size assemblies RL, TL and OL, is entered in the press 1, being placed on the bed of the press, the head 5 of the press being raised. As above noted, the cutting edges 45 of the assemblies are down. The press head is lowered to the point where plate 39 touches the upper edges of the assemblies (see FIG. 9), and the magnet 35 is energized magnetically to grip the assemblies. The head is then raised, carrying the assemblies up with it (see FIG. 10). As shown in FIG. 10, a stack S of sheets to be cut is delivered on to the bed 3 of the press under the head 5 and the cutting blade assemblies, and the head is then lowered to force the cutting blade assemblies through the sheets to cut pieces in the patterns (RL, TL, OL) of the assemblies. The head is then raised and the cut sheets taken out of the press, after which the head may be lowered and reversely energized to deposit the cutting blade assemblies on a board 51. The head is then raised, and the board with the assemblies thereon taken away. The cutting assemblies may then be converted to the medium size assemblies RM, TM, OM (FIG. 5), and the latter used in the press in the same manner as above described for cutting the medium size pieces. After removal of the medium size assemblies from the press, they may be converted to the small size assemblies RS, TS, OS (FIG. 6) and the latter used in the same manner as above described for cutting the small size pieces.

Figure 11:
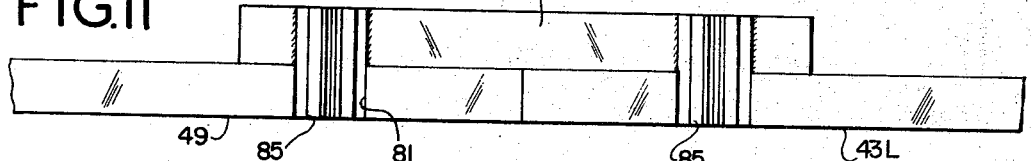
FIG. 11 is a plan of FIG. 12, illustrating an alternative mode of holding the blade segments of an assembly in their assembled relation.
Figure 12:
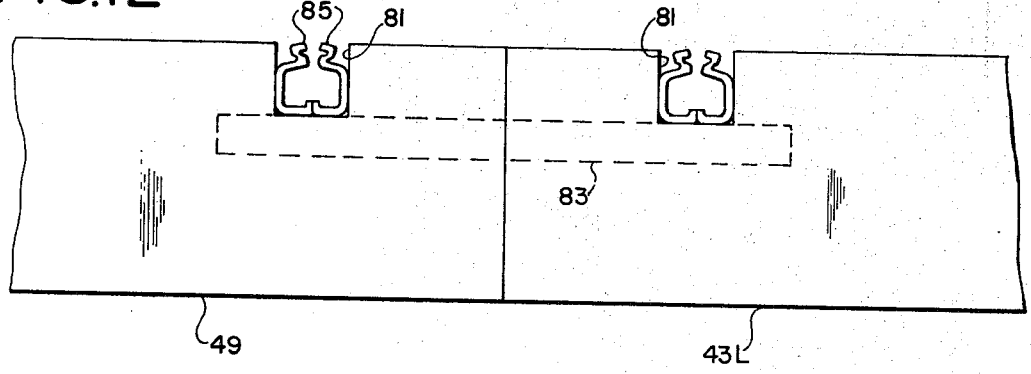
FIG. 12 is an elevation of FIG. 11.

FIGS. 11 and 12 show an alternative mode of releasably holding the blade segments of an assembly in their assembled relation (which may be used instead of the permanent magnets 53). In this modification, the blade segments have notches 81 in the top adjacent their ends, and members constituted by bars 83 having spring clips 85 removably received in the notches hold the segments in assembly. The bar extends across the abutting ends of two consecutive segments, and the spring clips extend laterally from the top of the bar into the notches.

Figure 13:
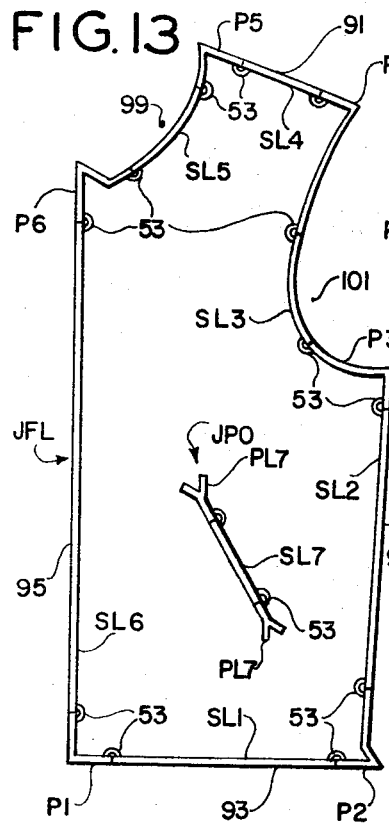
FIG. 13–15 are views showing typical cutting blade assemblies for a piece of a garment, such as a jacket, in three different sizes (e.g., large, medium, small)

FIG. 13 illustrates a cutting blade assembly JFL of this invention in a more complex pattern, namely, the pattern for a jacket front, in a large size. As shown, this comprises six primary or basic cutting blade segments P1-P6 and six auxiliary or "sizer" cutting blade segments SL1-SL6 assembled in a pattern of closed configuration corresponding to the outline of a jacket front to be cut out of suitable sheet material such as cloth. Permanent magnets 53 may be used releasably to hold the segments together. Generally, the pattern has top and bottom edges 91 and 93, front and side edges 95 and 97, a collar cutout 99 and a sleeve cutout 101. The six primary segments P1-P6 are all corner segments, P1 and P2 being at the bottom left and right as shown in FIG. 13, P6 and P3 being at the upper ends of the front and side edges 95 and 97, and P5 and P4 being at the top of the collar and sleeve cutouts 99 and 101. Auxiliary segment SL1 is a straight segment extending between bottom portions of primary segments P1 and P2. Auxiliary segments 95 and 97 are straight segments extending between upwardly extending portions of primary segments P1 and P2 and downwardly extending portions of primary segments P6 and P3. Auxiliary segments SL5 and SL3 are curved segments extending between upwardly extending portions of primary segments P6 and P3 and downwardly extending portions of primary segments P5 and P4. Auxiliary segment SL4 is a straight segment extending between top portions of primary segments P5 and P4.

Within the confines of the jacket front cutting assembly of FIG. 13 is a cutting blade assembly JPO for cutting an opening in the jacket front for a pocket. As shown, this pocket opening cutting blade assembly JPO comprises two identical primary cutting blade segments PL7 each of Y-shape and a single auxiliary cutting blade segment SL7 extending between the stems of the two Y-shaped segments. The segments are made of the same type of stock with cutting edges as above described, and assembled with the ends of auxiliary segment SL7 and the ends of said stems of the primary segments PL7 in abutting relation. Permanent magnets 53 such as previously mentioned may be used releasably to hold the segments together. The assembly cuts a slit with V-ends. This is illustrative of the application of the principles of the invention to cutting patterns other than of closed configuration.

Figure 14:
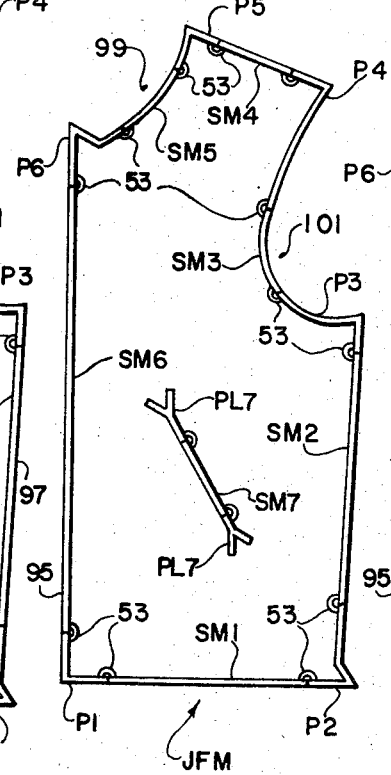
Figure 15:
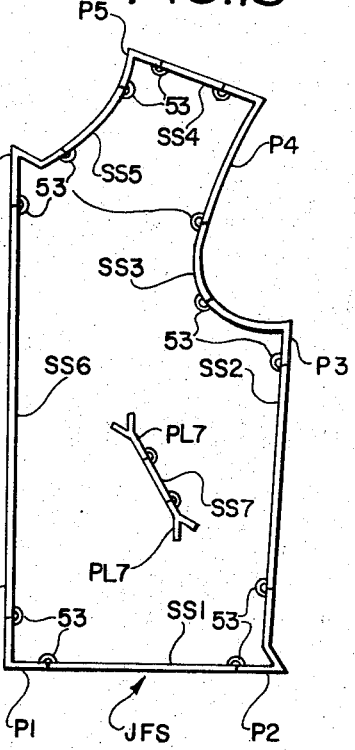

FIGS. 14 and 15 are views similar to FIG. 13 showing cutting blade assemblies JFM and JFS of the same outline as the FIG. 13 assembly JFL but smaller for cutting the jacket fronts in a medium size (FIG. 14) and a small size (FIG. 15). The same primary or basic segments P1-P7 as used in FIG. 13 are used for cutting the medium and small sizes, but the auxiliary segments for the medium size, designated SM1-SM7 are smaller (shorter) than those for the large size, and the auxiliary segments for the small size, designated SS1-SS7 are still smaller (shorter).

Figure 16:
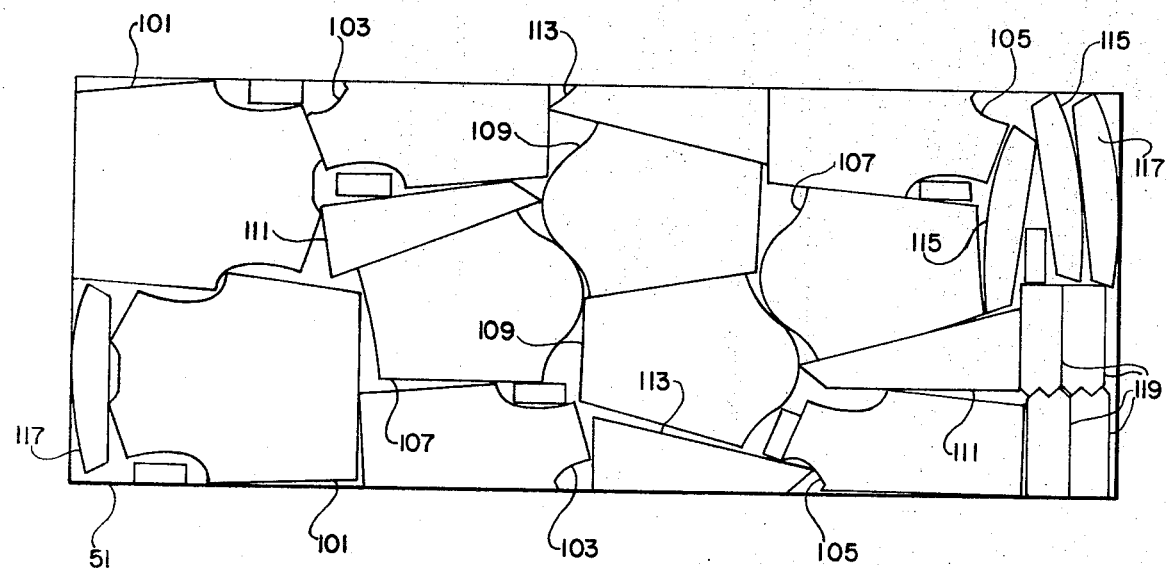
FIG. 16 is a plan of a typical complete cutting blade assembly layout for cutting out a plurality of pieces such as go into the manufacture of an item of apparel, e.g., a jacket.

Noting that FIGS. 4-6 illustrate only three simple geometric forms for the purpose of describing the invention in concise terms, FIG. 16 is included to show a typical complete cutting blade assembly layout such as may be used in the manufacture of jackets, including a multiplicity of cutting blade assemblies for cutting layers of cloth in a stack into a multiplicity of pieces such as go into the manufacture of a jacket. The layout is for cutting two of each of the pieces, with all of the pieces for one size of jacket in one style, and involve such pieces as a jacket back 101, right front 103, left front 105, right sleeve 107, left sleeve 109, right facing 111, left facing 113, low collar 115, top collar 117, cuff 119, etc. It will be observed that the left front assemblies 105 correspond to FIG. 13. Each cutting blade assembly of FIG. 16 is made up in accordance with the principles set forth above in respect to FIG. 4, for example.

In carrying out the invention in the manufacture of jackets, for example, a plurality of cutting blade assemblies such as shown in FIG. 16 for cutting pieces for the manufacture of a particular style of jacket in one size will be set up on an assembly or set-up board 51 (in the same manner as assemblies RL, TL and OL are set up in FIG. 4, for example). The board 51 is positioned on the bed of the press 1 under the press head 5, the latter being raised, and the head is lowered, energized magnetically to grip the assemblies and raised to pick up the entire cutting blade set-up off the board, and the board 51 is then taken out of the press. The cutting blade set-up is thus releasably mounted on the bottom of the head, with the cutting edges 45 of all the assemblies down, ready for cutting through layers or plies of cloth in a stack 121 on the bed of the press. The arrangement of the plurality of cutting blade assemblies in the set-up is preferably such as to cut the pieces with minimization of waste (the FIG. 16 arrangement being typical of this). The board is conveniently moved into and out of the press laterally, i.e., from one side or the other of the press.

A plurality of layers of cloth are laid up as previously described on the shuttle plate 19 on the lay-up table 11 (as many as eighteen layers, for example). The shuttle plate 19 is shuttled into the press 1 on top of the shuttle plate 27, the latter extending rearward from the stacker 15 on the bed of the press. Then shuttle plate 19 is retracted rearward while holding the stack 121 of layers of cloth from moving rearward to pull the shuttle plate 19 out from under the stack, which is thereby deposited on shuttle plate 27. On retraction of shuttle plate 19, another stack of layers is laid up on the plate 19 for the next cutting operation. The press head 5 is lowered to force the cutting blade assemblies through the stack 121, each assembly thus cutting as many pieces as there are layers. The head 5 is raised to pull the cutting blade assemblies up out of the layers; suitable spring stripping means (see FIG. 10A) may be provided in the cutting blade assemblies to hold the layers down while the assemblies are pulled up. This means may, for example, comprise blocks of sponge rubber 131 (see FIG. 10A) on steel plates 133 for being magnetically gripped to the press head, or steel springs. After the layers have been cut, shuttle plate 27 is shuttled forward to bring the cut stack over to the stacker 15, and the shuttle plate 27 is subsequently shuttled back into the press for the next operation, leaving the cut stack on conveyor 29 of the stacker. An additional stack or stacks may be cut, delivered to and stacked up on the stacker. When all the cutting desired with the cutting blade assemblies in the press is completed, a board 51 is placed in the press, and the press head 5 is lowered and reverse-energized to drop these cutting blade assemblies onto the board, which is then taken out of the press.

While the preceding operations are being carried out, a second cutting blade assembly set-up like that shown in FIG. 16 but for cutting pieces for another style of jacket, for example, may be laid up on a board 51. This is entered in the press and utilized for cutting stacks in the same manner as above described. In the meantime, the first cutting blade set-up for cutting pieces of one size for the first style may be disassembled and its primary cutting blade segments reassembled with auxiliary blade segments for cutting a second size of pieces in the first style, this last-named set-up being utilized after completion of cutting operations with the second setup, so on until all pieces in all sizes for a given style of jacket have been cut.

Figure 17:
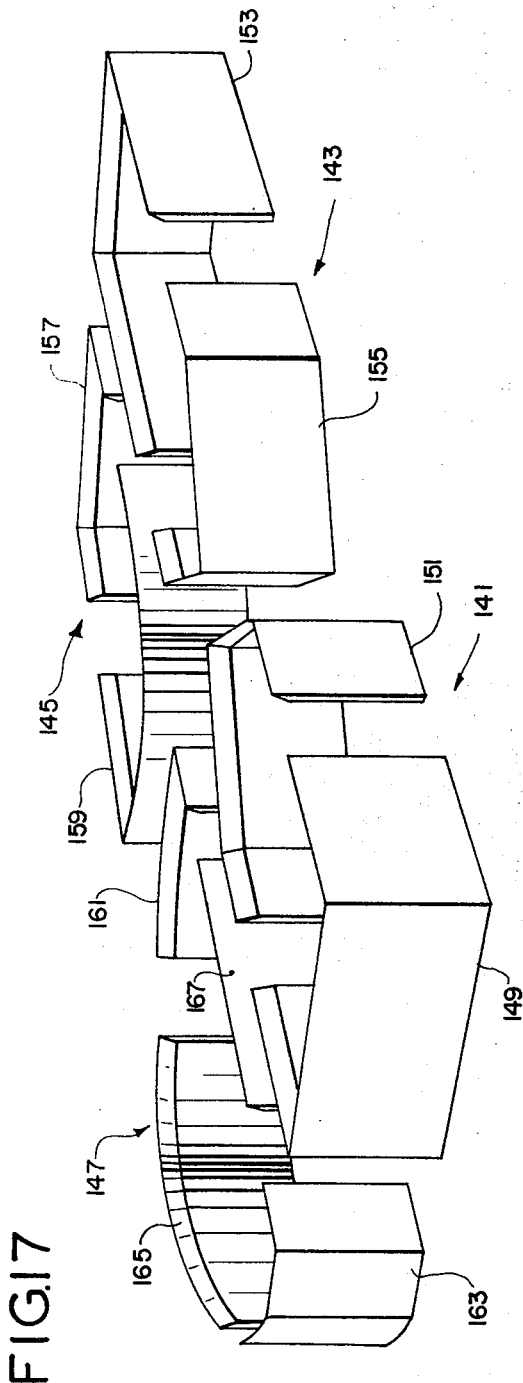
FIG. 17 is an exploded view showing an alternative multiple cutting blade assembly layout.
Figure 18:
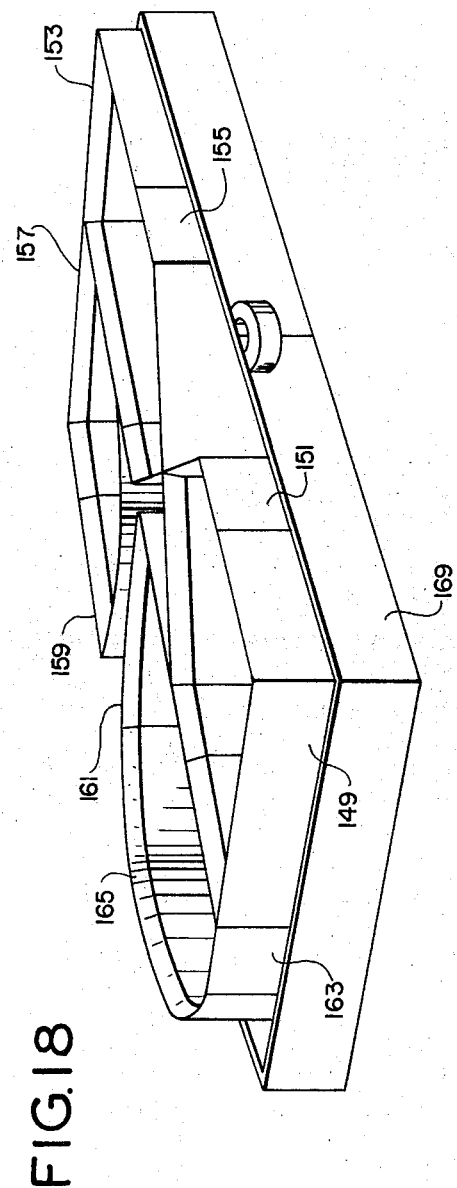
FIG. 18 is a perspective showing the FIG. 17 layout in its finally assembled condition.

FIGS. 17 and 18 show another multiple cutting blade assembly layout or set-up within the purview of this invention, the several assemblies thereof all being releasably held together with each held in its assembled condition by means encircling the assemblies. FIGS. 17 and 18 show four assemblies 141, 143, 145 and 147. By way of illustration only, assembly 141 comprises two primary segments 149 and 151, assembly 143 comprises two primary segments 153 and 155, assembly 145 comprises two primary segments 157 and 159, and assembly 147 comprises two primary segments 161 and 163 and two auxiliary segments 165 and 167. These are set up one in engagement with another and the segments of each one are held in assembly and the several assemblies (four, as illustrated) are held in assembly by means of what amounts to a band 169 encircling the set-up. This band is narrower than the segments, and is applied around the segments at their margins opposite their cutting edges, as shown in FIG. 18. The band may itself consist of segments of steel rule die stock held together by permanent magnets 53, or may be of any other suitable construction for banding the assemblies. It is contemplated that banded multiple cutting blade assembly set-ups such as shown in FIG. 18 may be utilized simply by placing them cutting edge down on a stack such as indicated at 121 in FIG. 10 without use of an electromagnetic head. The FIGS. 17–18 type of set-up illustrates an advantage of the feature of having the blade segments wholly flat on one side, noting that blade segments of two adjacent assemblies may be placed flat face to flat face, and make a line cut common to two pieces.

When the desired number of stacks of cut layers have been accumulated on the stacker 15 (these will all generally be identically cut), the conveyor 29 of the stacker is operated to convey the stacked-up layers over to the take-off conveyor 17. Here, the cut pieces will be manually taken off, leaving waste material on the conveyor 17, which is then driven to deliver the waste to the waste disposal system 33.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A cutting blade assembly for cutting sheet material in a predetermined pattern comprising a plurality of cutting blade segments each comprising a length of blade stock which is relatively thin in relation to its width, each segment having an edge thereof sharpened to constitute a cutting edge, said segments being assembled in said pattern with each end of each segment in end-to-end abutting relation with an end of another segment with the cutting edges of the segments extending continuously in said pattern, and means for releasably holding said segments assembled in said pattern and permitting ready disassembly of said segments, said segments being ferromagnetic and said holding means comprising magnetic means for magnetically gripping the segments.

2. A cutting blade assembly as set forth in claim 1 wherein said magnetic means comprises permanent magnet means magnetically gripped to the segments extending across their said abutting ends.

3. A cutting blade assembly for cutting sheet material in a predetermined pattern comprising a plurality of cutting blade segments each comprising a length of blade stock which is relatively thin in relation to its width, each segment having an edge thereof sharpened to constitute a cutting edge, said segments being assembled in said pattern with each end of each segment in end-to-end abutting relation with an end of another segment with the cutting edges of the segments extending continuously in said pattern, and means for releasably holding said segments assembled in said pattern and permitting ready disassembly of said segments, said segments having notches in their edges opposite their cutting edges and said holding means comprising members extending across the said abutting ends of the segments having spring clips removably received in said notches.

4. A cutting blade assembly for cutting sheet material in a predetermined pattern comprising a plurality of cutting blade segments each comprising a length of blade stock which is relatively thin in relation to its width, each segment having an edge thereof sharpened to constitute a cutting edge, said segments being assembled in said pattern with each end of each segment in end-to-end abutting relation with an end of another segment with the cutting edges of the segments extending continuously in said pattern, and quick-release means for releasably holding said segments assembled in said pattern and permitting substantially instantaneous disassembly of said segments, each of said cutting blade segments being sharpened on one face only of the segment at said cutting edge, the other face being flat, said segments, when assembled in said pattern of closed configuration corresponding to the contour of a piece to be cut out of the sheet material, having said sharpened faces of all the segments continuous and said flat faces of all the segments continuous.

* * * * *

PO-1050
(5/69)

UNITED STATES PATENT OFFICE
CERTIFICATE OF CORRECTION

Patent No. 3,826,170      Dated July 30, 1974

Inventor(s) Charles V. Jones, James W. Alvey, Charles H. Sanborn III

It is certified that error appears in the above-identified patent and that said Letters Patent are hereby corrected as shown below:

Front page, item "[75]", "Charles H. Sawborn, III' should read -- Charles H. Sanborn, III --; "Mich." should read -- Miss.--. Column 3, line 5,"Fig. 13-15" should read -- Figs. 13-15 --.

Signed and sealed this 8th day of October 1974.

(SEAL)
Attest:

McCOY M. GIBSON JR.            C. MARSHALL DANN
Attesting Officer               Commissioner of Patents